United States Patent
Araujo, Jr. et al.

(10) Patent No.: US 8,161,475 B2
(45) Date of Patent: Apr. 17, 2012

(54) AUTOMATIC LOAD AND BALANCING FOR VIRTUAL MACHINES TO MEET RESOURCE REQUIREMENTS

(75) Inventors: Nelson S. Araujo, Jr., Redmond, WA (US); Michael Michael, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 1294 days.

(21) Appl. No.: 11/540,879

(22) Filed: Sep. 29, 2006

(65) Prior Publication Data

US 2008/0082977 A1  Apr. 3, 2008

(51) Int. Cl.
*G06F 9/455* (2006.01)
*G06F 9/46* (2006.01)
*G06F 15/173* (2006.01)

(52) U.S. Cl. ............ 718/1; 718/104; 718/105; 709/224; 709/225; 709/226

(58) Field of Classification Search ...... 718/1, 104–105; 709/224–226
See application file for complete search history.

(56) References Cited

U.S. PATENT DOCUMENTS

| | | | | |
|---|---|---|---|---|
| 5,201,049 A | 4/1993 | Shorter | ............... | 395/650 |
| 5,291,597 A | 3/1994 | Shorter et al. | ............... | 395/650 |
| 5,572,694 A | 11/1996 | Uchino | ............... | 395/406 |
| 6,101,616 A | 8/2000 | Joubert et al. | ............... | 714/11 |
| 6,212,629 B1 | 4/2001 | McFarland et al. | ............... | 712/241 |
| 6,463,352 B1* | 10/2002 | Tadokoro et al. | ............... | 700/169 |
| 7,222,269 B2* | 5/2007 | Kurinami et al. | ............... | 714/47 |
| 7,480,719 B2* | 1/2009 | Inoue | ............... | 709/226 |
| 2004/0128670 A1 | 7/2004 | Robinson et al. | ............... | 718/1 |
| 2004/0221290 A1* | 11/2004 | Casey et al. | ............... | 718/104 |
| 2005/0198632 A1 | 9/2005 | Lantz et al. | ............... | 718/1 |
| 2006/0184937 A1* | 8/2006 | Abels et al. | ............... | 718/1 |
| 2007/0204266 A1* | 8/2007 | Beaty et al. | ............... | 718/1 |
| 2009/0313634 A1* | 12/2009 | Nguyen et al. | ............... | 718/105 |

FOREIGN PATENT DOCUMENTS

WO  WO 2005/036383 A2  4/2005

OTHER PUBLICATIONS

Connection Management, Programming WebLogic Server J2EE Connectors, © 2006 BEA Systems, http://edocs.bea.com/wls/docs81/jconnector/connect.html, 8 pages.
Whitaker, A. et al., "Scale and Performance in the Denali Isolation Kernel", http://www.cs.washington.edu/homes/gribble/papers/denali_osdi.pdf, 15 pages.

* cited by examiner

*Primary Examiner* — Kenneth Tang
(74) *Attorney, Agent, or Firm* — Woodcock Washburn LLP

(57) ABSTRACT

The embodiments contemplate a system and method for a provisioning, retirement and configuration of virtual machines. A predefined policy may include a desired target state of the virtual machines, as well as an action to initiate in order to reach the desired state. The action may be initiated if the state varies from the desired level by a predetermined amount or percentage over a predetermined period of time. Data from the virtual machines is analyzed to determine if the desired state of the virtual machines is satisfied. The analysis may be continuous or periodic. If it is determined that the desired state is not satisfied, then predefined actions are performed until the desired state is attained. The predefined actions may be the removal or addition of one or more virtual machines or other actions necessary to reach the desired state.

20 Claims, 5 Drawing Sheets

AUTOMATIC LOAD AND BALANCING FOR VIRTUAL MACHINES TO MEET RESOURCE REQUIREMENTS

BACKGROUND

A virtual machine is a software construct or the like operating on a computing device or the like for the purpose of emulating a hardware system. Typically, although not necessarily, the virtual machine is an application or the like and is employed on the computing device to host a user application or the like while at the same time isolating such user application from such computing device or from other applications on such computing device. A different variation of a virtual machine may, for example, be written for each of a plurality of different computing devices so that any user application written for the virtual machine can be operated on any of the different computing devices. Thus, a different variation of the user application for each different computing device is not needed.

New architectures for computing devices and new software now allow a single computing device to instantiate and run a plurality of partitions, each of which can be employed to instantiate a virtual machine to in turn host an instance of an operating system upon which one or more applications may be instantiated. Typically, although not necessarily, the computing device includes a virtualization layer with a virtual machine monitor or the like that acts as an overseer application or 'hypervisor', where the virtualization layer oversees and/or otherwise manages supervisory aspects of each virtual machine and acts as a possible link between each virtual machine and the world outside of such virtual machine.

Among other things, a particular virtual machine on a computing device may require access to a resource associated with the computing device. As may be appreciated, such resource may be any sort of resource that can be associated with a computing device. For example, the resource may be a storage device to store and retrieve data, and generally for any purpose that a storage device would be employed. Likewise, the resource may be any other asset such as a network, a printer, a scanner, a network drive, a virtual drive, a server, a software application, and the like. Accordingly, whatever the resource may be, the virtual machine may in fact be provided with access to services provided by such resource.

Virtual machines are an expensive system resource as they may occupy or consume large amounts of system resources, such as memory, disk space, and/or processor cycles. Furthermore, often virtual machines run and consume system resources while not being utilized. A virtual machine may, for example, inefficiently maintain access over a particular resource that it is not even utilizing. Or a user of the system may inadvertently leave the virtual machine running after use of the virtual machine has ceased.

Conventional and current monitoring systems may track the usage of system objects and accordingly take appropriate measures upon the determination of an inactive object. However, such monitoring systems may not accurately detect the usage of one or more virtual machines. For example, a guest operating system of a virtual machine may be performing maintenance tasks, downloading patches, or performing other operations that may not be related to a primary goal of the guest operating system. Such operations in the form of, for example, process usage or host statistics may inaccurately serve as an indication that the virtual machine is active when in fact the virtual machine may not be actively performing its primary goal.

In addition to determining if a virtual machine is active, a mechanism for the provisioning of virtual machines by a system administrator in order to achieve and maintain a desired state of the system, such as a target usage or threshold value, is not currently available. Such a mechanism may employ a policy administrator to set certain policy requirements, such as a predetermined target usage or threshold level, in order to attain a desired state.

Therefore, a mechanism and system to detect a state of a virtual machine and enforce a set of policies, which in turn may ensure that system resources are not being wasted or mismanaged, are desired.

SUMMARY

A virtual machine provisioning method and system operate to allocate and adjust the virtual machines according to a predefined policy, which may be created by a policy administrator. Data is collected from the virtual machines and other computing devices, and the type of data collected is dictated by the policy. The policy may also include one or more target levels or thresholds or usages, and a determination is made to ascertain if the target is being attained. When the target is not attained, the allocation of virtual machines is adjusted until the target is reached. The allocation may also be part of the policy defined by the system administrator.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing summary and the following detailed description are better understood when read in conjunction with the appended drawings. Exemplary embodiments are shown in the drawings, however it is understood that the embodiments are not limited to the specific methods and instrumentalities depicted therein. In the drawings.

DETAILED DESCRIPTION

Computer Environment

Figure 1:
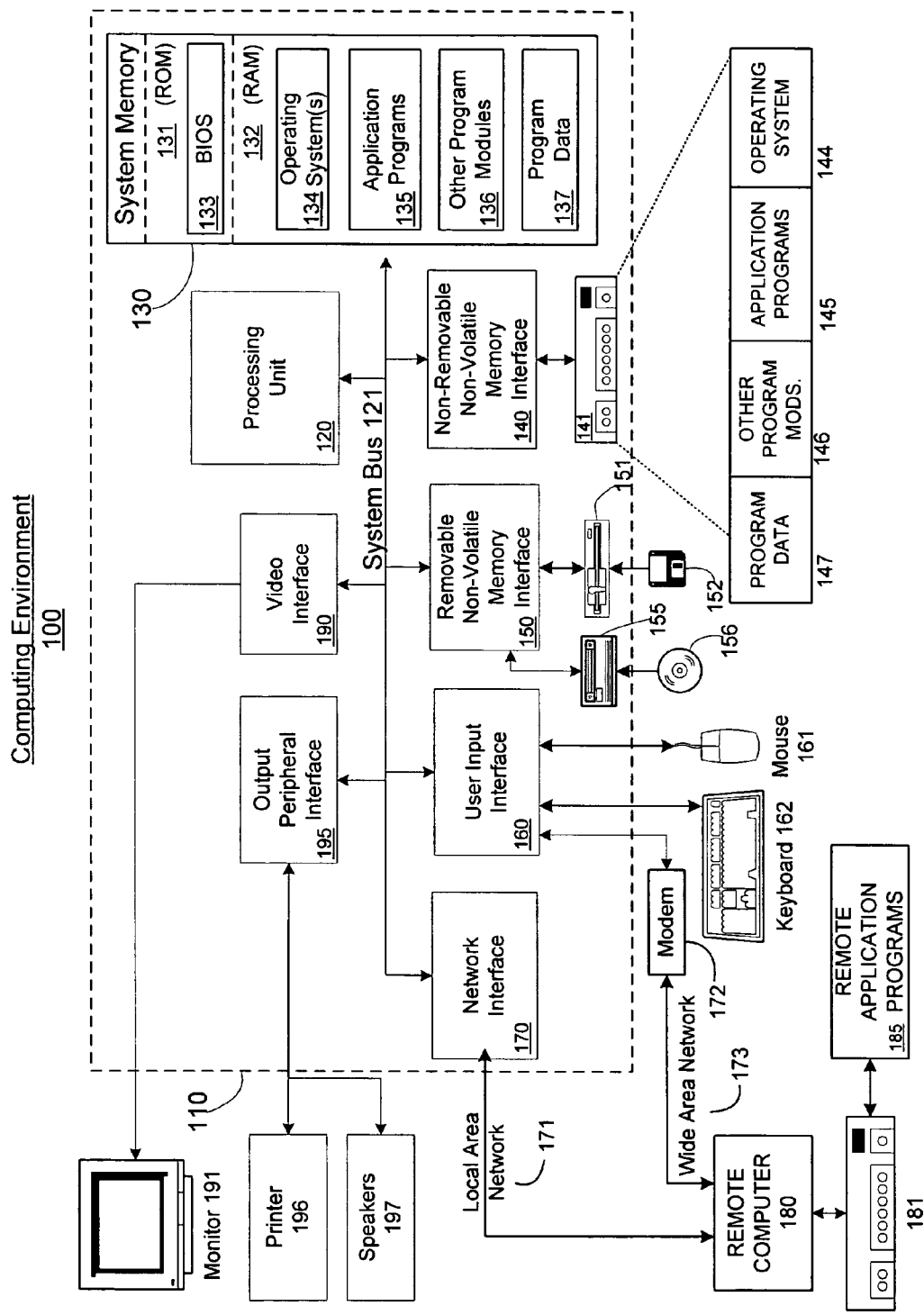
FIG. 1 is a block diagram representing an exemplary computing device in which the present invention may be implemented.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The computer 110 typically includes a variety of computer readable media. Computer readable media can be any available media that can be accessed by the computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within the computer 110, such as during start-up, is typically stored in ROM 131. RAM 132 typically contains data and/or program modules that are immediately accessible to and/or presently being operated on by the processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as an interface 140, and the magnetic disk drive 151 and the optical disk drive 155 are typically connected to the system bus 121 by a removable memory interface, such as an interface 150.

The drives and their associated computer storage media, discussed above and illustrated in FIG. 1, provide storage of computer readable instructions, data structures, components, program modules and other data for the computer 110. In FIG. 1, for example, the hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and a pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and a printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

All or portions of the methods of the present invention described above may be embodied in hardware, software, or a combination of both. When embodied in software, the methods of the present invention, or certain aspects or portions thereof, may be embodied in the form of program code that when executed by a computing system cause the computing system to perform the methods of the present invention. This program code may be stored on any computer-readable medium, as that term is defined above.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Distributed computing facilitates sharing of computer resources and services by direct exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects or resources that may interact to implicate authentication techniques of the present invention for trusted graphics pipeline(s).

Figure 2:
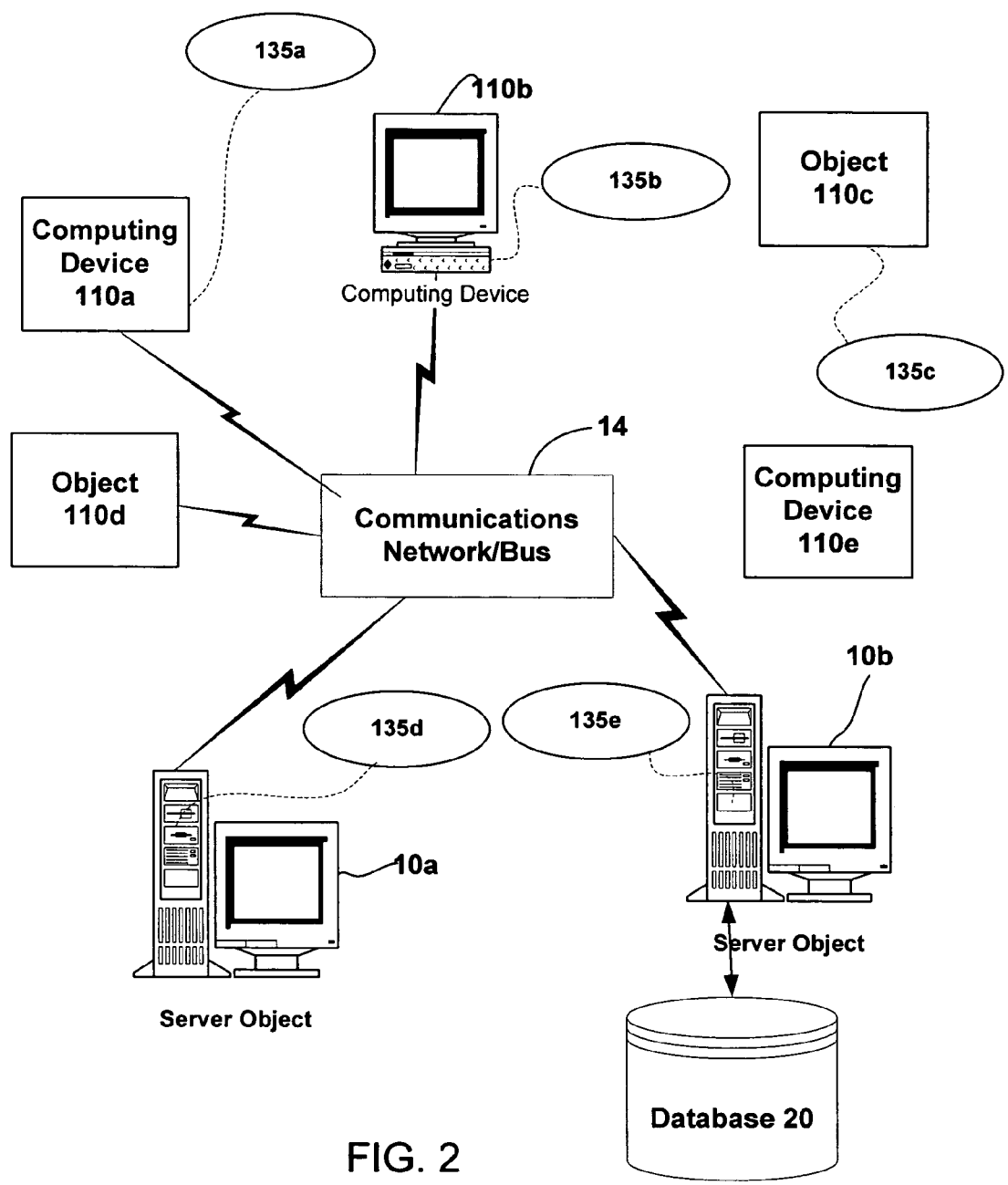
FIG. 2 is a block diagram representing an exemplary network environment having a variety of computing devices in which the present invention may be implemented.

FIG. 2 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, televisions, personal computers, etc. Each object can communicate with another object by way of the communications network 14. This network may itself comprise other computing objects and computing devices that provide services to the system of FIG. 2. In accordance with an aspect of the invention, each object 10 or 110 may contain an application that might request the authentication techniques of the present invention for trusted graphics pipeline(s).

It can also be appreciated that an object, such as 110c, may be hosted on another computing device 10 or 110. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wire-line or wireless systems, by local networks or widely distributed networks. Currently, many of the networks are coupled to the Internet, which provides the infrastructure for widely distributed computing and encompasses many different networks.

In home networking environments, there are at least four disparate network transport media that may each support a unique protocol such as Power line, data (both wireless and wired), voice (e.g., telephone) and entertainment media. Most home control devices such as light switches and appliances may use power line for connectivity. Data Services may enter the home as broadband (e.g., either DSL or Cable modem) and are accessible within the home using either wireless (e.g., HomeRF or 802.11b) or wired (e.g., Home PNA, Cat 5, even power line) connectivity. Voice traffic may enter the home either as wired (e.g., Cat 3) or wireless (e.g., cell phones) and may be distributed within the home using Cat 3 wiring. Entertainment media may enter the home either through satellite or cable and is typically distributed in the home using coaxial cable. IEEE 1394 and DVI are also emerging as digital interconnects for clusters of media devices. All of these network environments and others that may emerge as protocol standards may be interconnected to form an intranet that may be connected to the outside world by way of the Internet. In short, a variety of disparate sources exist for the storage and transmission of data, and consequently, moving forward, computing devices will require ways of protecting content at all portions of the data processing pipeline.

The 'Internet' commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers processing networking protocols that allow users to interact and share information over the networks. Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer e.g., a server. In the example of FIG. 2, computers 110a, 110b, etc. can be thought of as clients and computer 10a, 10b, etc. can be thought of as the server where server 10a, 10b, etc. maintains the data that is then replicated in the client computers 110a, 110b, etc.

A server is typically a remote computer system accessible over a remote network such as the Internet. The client process may be active in a first computer system, and the server process may be active in a second computer system, communicating with one another over a communications medium, thus providing distributed functionality and allowing multiple clients to take advantage of the information-gathering capabilities of the server.

Client and server communicate with one another utilizing the functionality provided by a protocol layer. For example, Hypertext-Transfer Protocol (HTTP) is a common protocol that is used in conjunction with the World Wide Web (WWW). Typically, a computer network address such as a Universal Resource Locator (URL) or an Internet Protocol (IP) address is used to identify the server or client computers to each other. The network address can be referred to as a Universal Resource Locator address. For example, communication can be provided over a communications medium. In particular, the client and server may be coupled to one another via TCP/IP connections for high-capacity communication.

Thus, FIG. 2 illustrates an exemplary networked or distributed environment, with a server in communication with client computers via a network/bus, in which the present invention may be employed. In more detail, a number of servers 10a, 10*b*, etc., are interconnected via a communications network/bus 14, which may be a LAN, WAN, intranet, the Internet, etc., with a number of client or remote computing devices 110*a*, 110*b*, 110*c*, 110*d*, 110*e*, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to process, store or render secure content from a trusted source, and to any computing device with which it is desirable to render high performance graphics generated by a virtual machine.

In a network environment in which the communications network/bus 14 is the Internet, for example, the servers 10 can be Web servers with which the clients 110*a*, 110*b*, 110*c*, 110*d*, 110*e*, etc. communicate via any of a number of known protocols such as HTTP. Servers 10 may also serve as clients 110, as may be characteristic of a distributed computing environment. Communications may be wired or wireless, where appropriate. Client devices 110 may or may not communicate via communications network/bus 14, and may have independent communications associated therewith. For example, in the case of a TV or VCR, there may or may not be a networked aspect to the control thereof. Each client computer 110 and server computer 10 may be equipped with various application program modules or objects 135 and with connections or access to various types of storage elements or objects, across which files may be stored or to which portion(s) of files may be downloaded or migrated. Thus, the present invention can be utilized in a computer network environment having client computers 110*a*, 110*b*, etc. that can access and interact with a computer network/bus 14 and server computers 10*a*, 10*b*, etc. that may interact with client computers 110*a*, 110*b*, etc. and other devices 111 and databases 20.

Virtual Machine Provisioning: Administrator-Based

Figure 3:
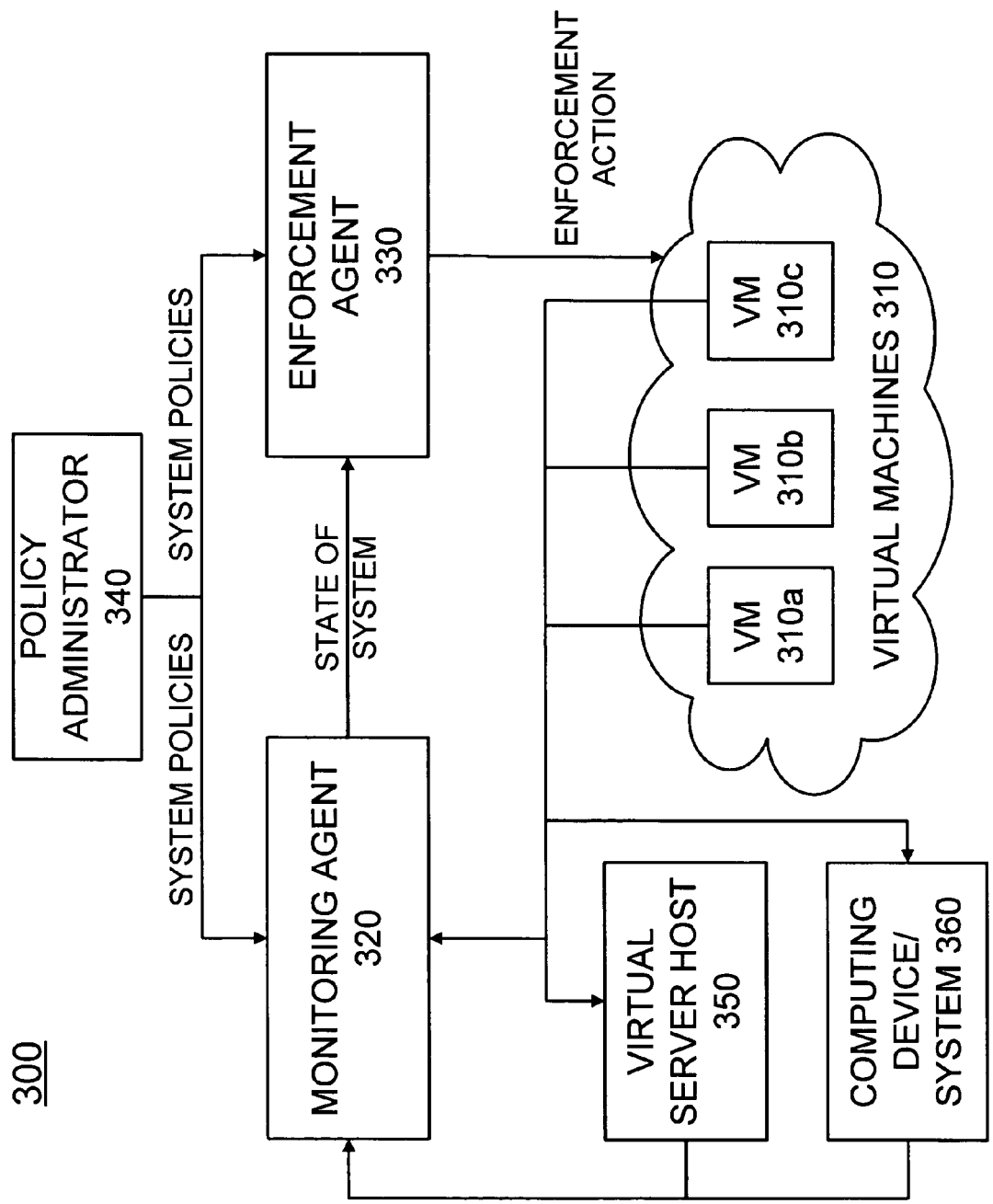
FIG. 3 is a block diagram representing a virtual machine provisioning system in accordance with embodiments of the present invention.

A mechanism for the provisioning of virtual machines is desired in order to achieve and maintain a predetermined state or requirement of a system of virtual machines. A virtual machine provisioning system 300 to achieve this goal is illustrated in FIG. 3. Virtual machines 310 are connected to a monitoring agent 320. FIG. 3 illustrates three virtual machines 310 (310*a*, 310*b*, and 310*c*), although the number of virtual machines is not so limited and more or fewer virtual machines 310 may form part of the virtual machine provisioning system 300. The monitoring agent 320 is responsible for collecting data from the virtual machines 310. The monitoring agent 320 may also collect data from a virtual server host 350, connected to virtual machines 310, and/or from a computing device or system 360, also connected to virtual machines 310. The computing device or system 360 may include, for example, a network router, load balancing hardware, a firewall, a software management system, and/or any combination thereof. The collected data may be used to determine a state of the virtual machines 310 and to determine if their state or that of the system, which may be a combination of virtual machines 310 from multiple servers, is at a predetermined state. The provisioning mechanism is employed, as described in further detail below, if the state of the virtual machines 310 is not at or near the predetermined state.

The monitoring agent 320 receives instructions or system policies from a policy administrator 340 that may be responsible for creating the system policies. The system policies may include various system parameters or requirements needed to attain a desired system goal or system functionality. For example, in a server environment where the virtual machines 310 may act as individual system servers, the policy administrator 340 may define network activity. For example, network activity may include a group of usage policies based upon web activity of the servers. The policies may include a target usage of a particular number of web pages per minute per server. A target server count, or number of servers to achieve the target usage, may also be dictated as part of the system policies. Other system policies in the server example may include but are not limited to: an upper usage limit; a lower usage limit; a number of servers to remove upon detection of low usage; a number of servers to add upon detection of high usage; and a usage threshold indicating the need to add or remove a server. Usage may refer to network bandwidth, CPU, memory, disk utilization, and/or any combination thereof. The usage policies identified herein are just one set of examples of system policies. Other system policies or groups of system policies may be created and applied. Moreover, usage may be defined based upon the particular function or goal of the policy. For example, usage may be pages/minute, bytes/second, selects/hour, and/or inserts/day.

The policy administrator 340, upon creating the system polices, may relay this information to the monitoring agent 320. The monitoring agent 320 then uses the received system policies in order to obtain relevant information from the virtual machines 310, from the virtual server host 350, and/or from the computing device/system 360. For example with respect to the server situation described above, the system policies include various web usage policies. The monitoring agent 320 may accordingly monitor and collect web usage, in for example web pages per minute per server, from each of the virtual machines 310 such as the virtual machines 310*a*, 310*b*, and 310*c*. Thus, the monitoring agent 320 may collect information from the virtual machines 310 and other monitoring devices or systems, such as the virtual server host 350 and the computing device/system 360, that is related to the system policies defined by the policy administrator 340.

The monitoring agent 320, in addition to collecting information from the virtual machines 310, directly or indirectly, and receiving system policy information from the policy administrator 340, may be responsible for determining a state of the system 300 based upon the collected data and the system policies. The system of virtual machines 310 may be in a healthy or an unhealthy state. The state determination may be made by a comparison operation in which the collected data is compared against the target usages. If the collected data is higher or lower than the target usage, the system may be said to be unhealthy. An unhealthy state may be defined as a deviation from the target usage over a period of time. An unhealthy state may, for example, be a +/−10% deviation from the target usage for a 24 hour period. Or an unhealthy state may be a +10% deviation from the target usage for a 15 minute period or a −5% deviation from the target usage for a 24 hour period. The state parameters may be defined by the policy administrator 340 according to previously collected data.

In addition to state parameters, the policy administrator 340 may also define as part of the system policies the action or actions to be taken when it is determined that the system is in an unhealthy state and has violated the set, defined policies. Such an action may be referred to as a violation action and may be a configurable parameter. Violation actions may include but are not limited to the following: stop a virtual machine 310; pause a virtual machine 310 for a predetermined amount of time; delete a virtual machine 310; add a virtual machine 310; archive a virtual machine 310; send a notification to an owner of a virtual machine 310 and/or the policy administrator 340; add memory to a virtual machine 310; add a virtual processor to a virtual machine 310; dedicate more CPU to a virtual machine 310; dedicate less CPU to a virtual machine 310; save a state of a virtual machine 310; and quarantine a virtual machine 310. If the violation action includes sending a message to an owner of a virtual machine 310 and/or the policy administrator 340, then the message may be sent by, but is not limited to, email, pager, or cell phone message.

The system may employ one or more strategies to comply with policy requirements. One such strategy is to migrate virtual machines 310 to other host servers to allow them to increase their capacity. Another strategy may include migrating all or some of the other virtual machines 310 from this host such that a particular virtual machine 310 can indirectly utilize the freed resources. Such strategies may be especially useful when dealing with CPU thresholds.

The policy, which may be defined by the policy administrator 340, may contain different actions for various levels or thresholds of violation. For example if the violation is within 10% of its target, one particular action may be performed, as specified by the policy. However, for a more extreme violation, such as a 30% deviation from a target, a more drastic action may accordingly be performed.

An enforcement agent 330 is responsible for performing a violation action as defined by the policy administrator 340. The enforcement agent 330 and the monitoring agent 320, although shown as separate components in FIG. 3, may be one component without departing from the spirit and scope of the described embodiments. The policy administrator 340 provides the violation action to the enforcement agent 330. The violation action may be a portion of the system policies. The monitoring agent 320 provides an indication to the enforcement agent 330 if an unhealthy state, as defined through the system policies by the policy administrator 340, is reached. Upon such an indication, the enforcement agent 330 may then take appropriate action based upon the defined violation action.

For example, suppose that the policy administrator 340 defines system policies as a target usage of a web server at 1,000 pages per minute per web server for a target of 10 virtual machines 310. The target usage is, in this example, the monitored variable and is used to determine the state (healthy or unhealthy) of the system. The virtual machines 310 provide their respective usage in number of pagers per minute to the monitoring agent 320. Further suppose that the policy administrator 340 defines an unhealthy state as +/−10% change in usage over a 24 hour time period. If the monitoring agent 320 detects in virtual machine 310a +/−10% change in usage over a 24 hour time period, then the monitoring agent 320 relays such detection to the enforcement agent 330 to take appropriate action. Suppose that the policy administrator 340 defines a violation action as deleting a virtual machine if the usage for the particular virtual machine is −10% below 1,000 pages per minute and adding a virtual machine if the usage is +10% above 1,000 pages per minute. The policy administrator 340 communicates to the enforcement agent 330 the action to take when the enforcement agent 330 receives an indication from the monitoring agent 320. The enforcement agent 330 may need to take action on other devices to remedy the violation. For example, the enforcement agent 330 may need to reconfigure a load and balancing hardware to inform it about the new machine being added or removed from the system and become active or reconfigure a firewall to allow traffic to flow to the new machine.

Figure 4:
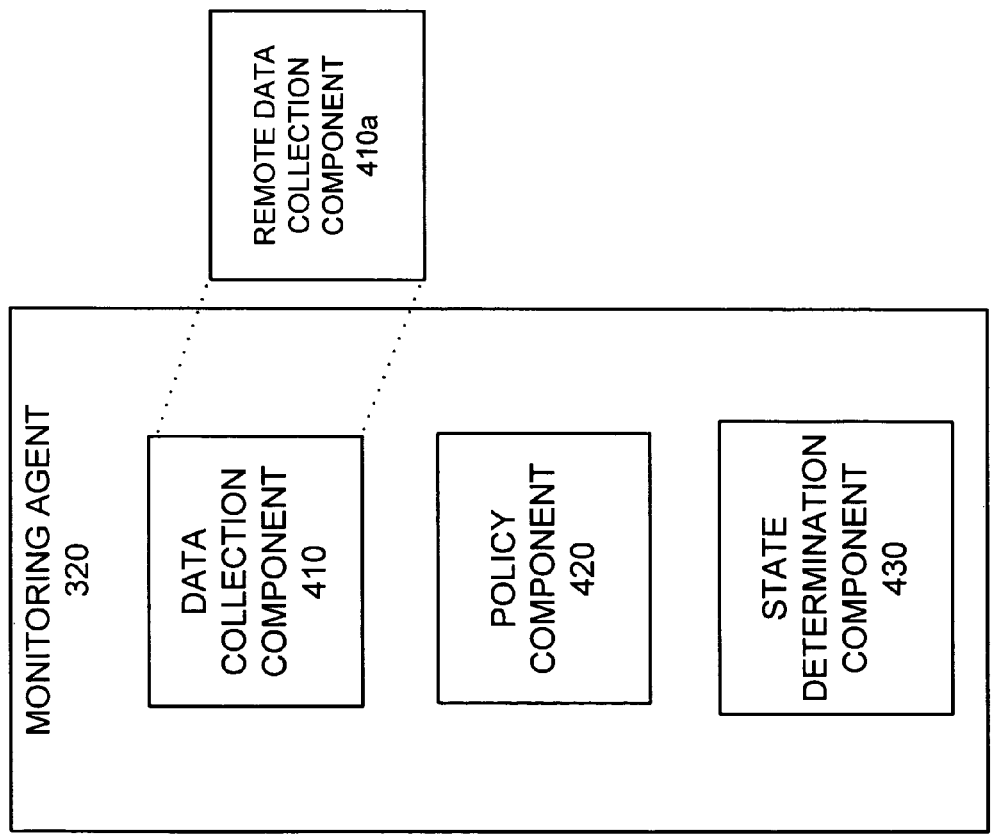
FIG. 4 is a block diagram representing a monitoring agent in accordance with one embodiment of the present invention.

FIG. 4 is a block diagram of a monitoring agent 320 according to an embodiment of the invention. The monitoring agent 320 includes several means, devices, software, and/or hardware for performing functions, including a data collection component 410, a policy component 420, and a state determination component 430, which may operate to obtain information from a plurality of virtual machines 310 and use the obtained information to determine a state of the system of virtual machines 310.

The data collection component 410 operates to collect information from the virtual machines 310. The information may be continuously collected or may be collected at predetermined intervals as specified by the policy administrator 340. The data collection component 410 may reside on a different server and may operate to collect information from more than one server. The data collection component 410 as a remote component 410a is also shown in FIG. 4. The information to be collected by the data collection component 410 is dictated by the policy administrator 340 according to policy considerations deemed necessary by the policy administrator 340. The policy component 420 operates to receive the system policies from the policy administrator 340 and also operates to provide this information to the data collection component 410. In this manner, through the policy component 420 and the data collection component 410, the monitoring agent 320 is made aware of the system policies and is informed as to the type of information to collect.

The state determination component 430 of the monitoring agent 320 operates to determine the state of the virtual machines 310. A desired state is defined as part of the system policies made by the policy administrator 340. If the desired state is attained, the virtual machines are in a healthy state. If the desired state is not attained, an unhealthy state occurs. Alternatively and in addition to a healthy state, a warning state may exist where, for example, the unhealthy state is close to being reached. The warning state may be defined as a predetermined deviation from the unhealthy state. If a warning state is reached, the state of the virtual machines 310 may still be in a healthy state with the warning state serving as a level of indication of the state of the virtual machines 310.

The state determination component 430 uses the system policy information, which is obtained from the policy component 420, and the information collected from the virtual machines 310 by the data collection component 410 to determine the state of the virtual machines 310. Additionally, upon determination of a warning state, as defined by the policy administrator 340 and obtained from the policy component 420, the state determination component 430 may perform a warning action. The warning action may include, but is not limited to, providing a notification to an owner of a virtual machine 310 and/or the policy administrator 340.

The policy administrator 340 may create a policy that is associated with many resources for which one or more violation logics are defined. For each violation logic, one or more thresholds and resulting actions/notifications may be attached. Violations may also define the state of the resource, giving the administrator 340 the option to create one or more states for a resource (i.e. Warning, Healthy, Error state).

Figure 5:
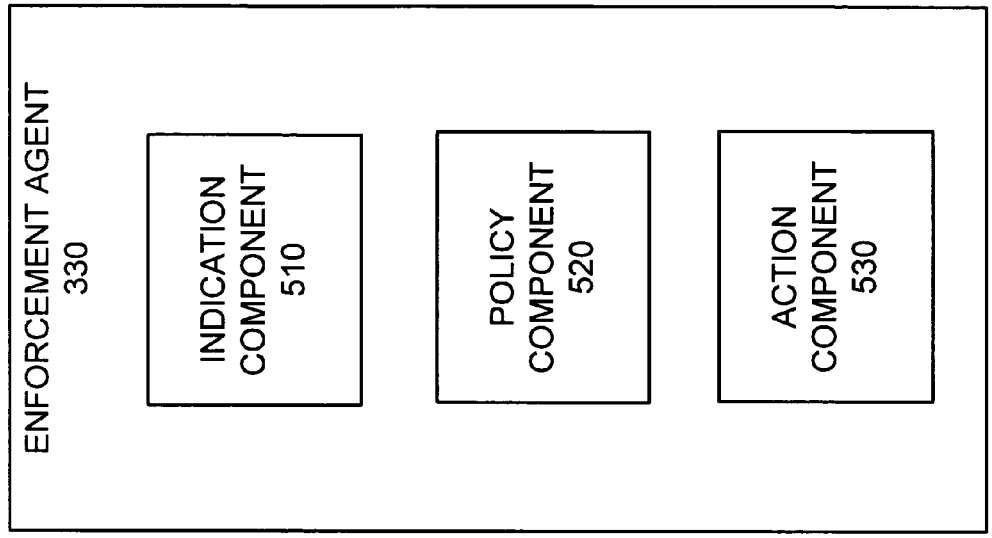
FIG. 5 is a block diagram representing an enforcement agent in accordance with one embodiment of the present invention.

FIG. 5 is a block diagram of an enforcement agent 330 according to an embodiment of the invention. The enforcement agent 330 includes several means, devices, software, and/or hardware for performing functions, including an indication component 510, a policy component 520, and an action component 530, which operate to take appropriate action as dictated by the policy administrator 340 in order to adjust resources, such as the allocation of virtual machines 310 for example. The adjustment of resources is performed to achieve a healthy state as defined by the policy administrator 340. The achievement of a healthy state may indicate that the requirements for a given resource are met.

The indication component 510 provides an indication of an unhealthy state. The indication component 510 may receive warning of an unhealthy state from the state determination component 430 of the monitoring agent 320. Upon notification of an unhealthy state, the indication component 510 relays the indication to the action component 530. The action component 530 is responsible for performing an operation to alleviate the unhealthy state. The action component 530 of the enforcement agent 330 performs a violation action as defined in the system policies by the policy administrator 340. The action component 530 is informed of the violation action to be performed by the policy component 520.

Figure 6:
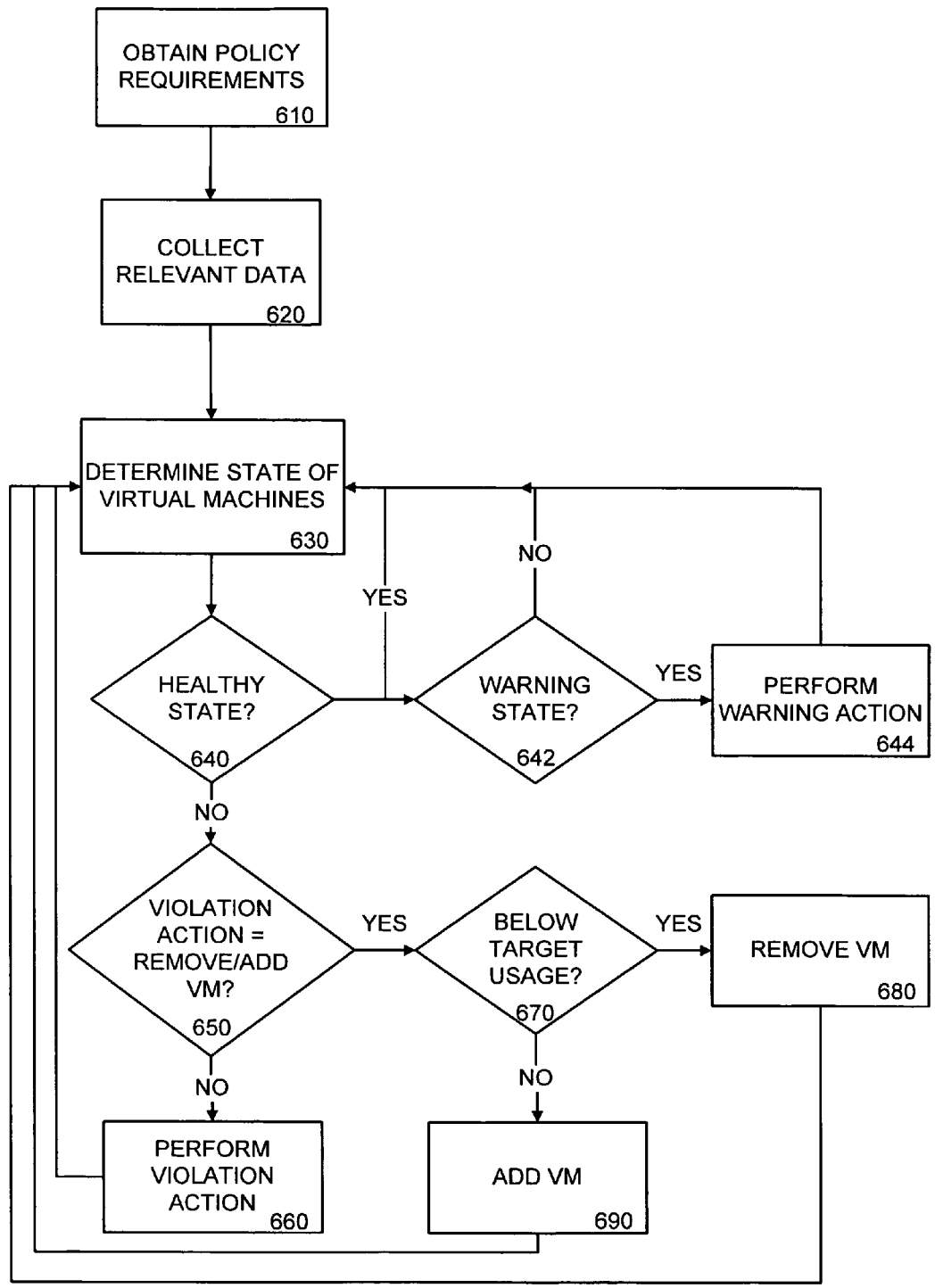
FIG. 6 is a flow diagram illustrating a virtual machine provisioning method in accordance with one embodiment of the present invention.

A virtual machine provisioning method is described in relation to the flow chart of FIG. 6. At 610, system policy requirements are obtained. The system policies may include system parameters or requirements needed for example to attain a desired system goal, such as target usages, and a violation action to be taken when the virtual machines 310 are not in a healthy state. The system policies are provided to the monitoring agent 320 and the enforcement agent 330 by the policy administrator 340. The monitoring agent 320 may receive the system parameters or requirements, while the enforcement agent 330 may receive the violation action to perform upon notification that the virtual machines 310 are in an unhealthy state.

At 620, relevant data is collected. The relevant data may be collected by the monitoring agent 320 from the virtual machines 310 or from other computing devices or systems, such as computing device/system 360. Data may be collected from one virtual machine 310 such as virtual machine 310a or multiple virtual machines 310 such as 310b and 310c. The interval at which data is collected for each virtual machine 310 or device 360 is also configurable by policy or other means. The system may have a predefined set of policies/violations for common scenarios/workloads and devices. The relevant data may be determined based upon the system policies. At 630, a state of the virtual machines 310 is determined. The determination may be made by the monitoring agent 320 by comparing the collected data to the system policies. If for example the collected data differs from a preferred system parameter by more or less than a predetermined amount, then the monitoring agent 320 may determine that the virtual machines 310 are in an unhealthy state.

If, at 640, it is determined that the virtual machines 310 are in a healthy state, then the virtual machine provisioning method may return to 630 to continue the operation of determining the state of the virtual machines 310. The method may proceed in this manner until the virtual machines 310 leave a healthy state and require provisioning to return to the healthy state.

At 642, optionally following a determination that the virtual machines 310 are in a healthy state, a determination may be made to ascertain if a warning state exists. While in a healthy state, the warning state may indicate that the system of virtual machines 310 is close to an unhealthy state. The warning state may be defined by the policy administrator 340 and may include a predetermined deviation from the defined unhealthy state. At 644, if a warning state does exist, then a warning action is performed by, for example, the state determination component 430.

If instead at 640, it is determined by the state determination component 430 that the virtual machines 310 are in an unhealthy state, as described in more detail above, then the method may continue to 650. At 650, the violation action, which may be part of the system policies as defined by the policy administrator 340, is examined by the action component 530 to determine if the action requires an addition or removal of a virtual machine 310. Such an action may be warranted in a server situation where the virtual machines 310 act as servers and the usage in web pages per minute per server is monitored.

If the violation action does not specify the addition or removal of a virtual machine 310, then the specified violation action is performed at 660 by the action component 530. If instead the specified action does indicate that the addition or removal of a virtual machine 310 should be performed, then at 670 a target usage determination is made by a consultation between the policy administrator 340 and the policy component 420. If it is determined by the state determination component 430 determined at 670 that the current usage of the virtual machines 310 is below the target usage, then the method proceeds to 680, where a virtual machine 310 is removed by the action component 530. The removal of a virtual machine 310 assists in distributing the usage among the remaining virtual machines 310 so that the virtual machines 310 may be used more efficiently. The need to remove a virtual machine 310 may indicate that the virtual machines 310 can handle a larger amount of work and that one or more of the virtual machines 310 is not necessary.

Alternatively, if it is determined at 670 by the action component 530 that the current usage of the virtual machines 310 is not below the target usage, then the method proceeds to 690 where a virtual machine 310 is added. If the current usage exceeds the target usage, this may serve as in indication that the virtual machines 310 are handling too much work. An addition of a virtual machine 310 helps to relieve some of this excess.

After a violation action is performed at 660 or a virtual machine 310 has been removed or added at 680 or 690, respectively, by the action component 530, the provisioning method proceeds to 630 to again determine a state of the virtual machines 310. This may ensure that the state is continually monitored so that appropriate provisions are made. Alternatively, the state may be monitored after a predetermined time period has elapsed.

CONCLUSION

In conclusion, the present invention employs a policy that specifies a requirement such as a system goal or preferred level of service with regard to the virtual machine or machines 310. The policy also specifies an input from the virtual machine or machines 310 and computing devices or systems, such as computing device/system 360, to be collected by the monitoring agent 320. The policy further specifies an action with regard to the virtual machine or machines 310 to be taken by the enforcement agent 330 if the specified requirement is violated as determined according to the input by the monitoring agent 320.

As can be appreciated, the disclosed embodiments may be implemented as a whole or in part in one or more computing systems or devices. FIG. 1 illustrates the functional components of one example of a computing system 100 in which aspects may be embodied or practiced. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, handheld computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. Program code and/or data can be implemented in the form of routines, programs, objects, modules, data structures and the like that perform particular functions.

It is noted that the foregoing examples have been provided for the purpose of explanation and are in no way to be construed as limiting. While the invention has been described with reference to various embodiments, it is understood that the words which have been used herein are words of description and illustration, rather than words of limitation. Although the embodiments have primarily been described with reference to multiple virtual machines, the embodiments are not intended to be limited to multiple virtual machines and in fact one virtual machine may be used without departing from the spirit and scope of the present invention. Further, although the embodiments have been described herein with reference to particular means, materials, and examples, the embodiments are not intended to be limited to the particulars disclosed herein; rather, the embodiments extend to all functionally equivalent structures, methods and uses, such as are within the scope of the appended claims.

What is claimed is:

1. A method, comprising:
   receiving a policy related to a virtual machine (VM), the policy specifying a requirement with regard to the VM;
   receiving an action to be taken with regard to the VM, the action corresponding to the requirement, the action to be taken in response to determining that the requirement is violated;
   receiving an input of the policy that has been sent by the VM;
   receiving a second input of the policy from a second VM;
   determining from the input and the second input that the requirement of the policy is violated; and
   taking the action of the policy in response to the violation.

2. The method of claim 1, wherein taking the action of the policy in response to the violation comprises:
   adding a virtual machine to the VM or another VM, wherein the violation comprises an excess of the requirement.

3. The method of claim 1, wherein taking the action of the policy in response to the violation comprises:
   removing a virtual machine from the VM or another VM, wherein the violation comprises a shortage of the requirement.

4. The method of claim 1, wherein the requirement comprises:
   an amount of traffic of the VM.

5. The method of claim 1, wherein taking the action of the policy in response to the violation comprises:
   taking the action of the policy in response to determining that the violation persists for a predetermined period of time.

6. The method of claim 1, wherein taking the action of the policy in response to the violation comprises:
   taking the action of the policy in response to determining that the violation exceeds or lacks the requirement by a predetermined amount.

7. The method of claim 1, further comprising:
   sending a notification to a user of the VM; and
   taking the action of the policy in response to receiving user input indicative of taking the action of the policy.

8. A computer storage medium bearing computer-readable instructions that, upon execution by a computer, cause the computer to perform operations comprising:
   receiving a policy related to a virtual machine (VM), the policy specifying a requirement with regard the VM;
   receiving an action to be taken with regard to the VM, the action corresponding to the requirement, the action to be taken in response to determining that the requirement is violated;
   receiving an input of the policy that has been sent by the computing device, the input being indicative of the state of the VM;
   receive a second input of the policy from a computing device;
   determining from the input and the second input that the requirement of the policy is violated; and
   taking the action of the policy in response to the violation.

9. The computer storage medium of claim 8, wherein taking the action of the policy in response to the violation comprises at least one of:
   adding an additional virtual machine to the computing device or another computing device in response to the violation, wherein the violation comprises an excess of the requirement;
   and removing one virtual machine to the computing device or another computing device in response to the violation, wherein the violation comprises a shortage of the requirement.

10. The computer storage medium of claim 8, wherein the requirement is at least one of:
    a predefined network activity; an amount of traffic; and a target usage of a particular number of web pages per minute per server.

11. The computer storage medium of claim 8, wherein taking the action of the policy in response to the violation comprises:
    taking the action of the policy in response to the violation in response to determining that the violation persists for a predetermined period of time and in response to determining that the violation exceeds or lacks the requirement by a predetermined amount.

12. The computer storage medium of claim 8, wherein taking the action of the policy in response to the violation comprises:
    presenting a notification with an output device; and
    taking the action of the policy in response to user input indicative of taking the action of the policy.

13. The computer storage medium of claim 8, wherein the computing device comprises another VM.

14. A system, comprising:
    a processor; and
    a memory communicatively coupled to the at least one processor when the system is operational, the memory bearing instructions that, upon execution by the processor, cause the system to at least:
    receive a policy related to a virtual machine (VM), the policy specifying a requirement with regard to the VM;
    receive an action to be taken with regard the VM, the action corresponding to the requirement, the action to be taken in response to determining that the requirement is violated;
    receive an input of the policy that has been provided by the VM, the input comprising a network bandwidth used by the VM, an amount of the VM's virtual CPU resources used by the VM, an amount of the VM's virtual memory used by the VM, or an amount of the VM's virtual hard disk used by the VM;

receive a second input of the policy from a computing device;

determine from the input and the second input that the requirement of the policy is violated; and take the action of the policy in response to the violation.

15. The system of claim 14, wherein the action of the policy is one of:

adding another VM to the computing device or another computing device; deleting the VM; stopping the VM; pausing the VM for a predetermined amount of time; archiving the VM; sending a notification to an owner of the VM and/or a policy administrator; adding memory to the VM; adding a virtual processor to the VM; dedicating more CPU to the VM; dedicating less CPU to the VM; saving a state of the VM; and quarantining the VM.

16. The system of claim 14, wherein the input of the policy from the computing device comprises:

an amount of traffic.

17. The system of claim 14, wherein the input of the policy from the VM comprises:

a number of users; and wherein the requirement of the policy comprises:

an upper usage limit of number of users, or a lower usage limit of number of users.

18. The system of claim 14, wherein a violation of the requirement comprises:

an excess of the requirement, or a shortage of the requirement; and wherein the excess and shortage deviate from the requirement by a predetermined amount for a predetermined period of time.

19. The system of claim 14, wherein the receiving the policy, receiving the action, receiving the input, determining and taking are performed by a monitoring agent communicatively coupled to the VM.

20. The system of claim 14, wherein the computing device comprises another VM.

* * * * *